United States Patent
Zhu

[11] Patent Number: 5,755,860
[45] Date of Patent: May 26, 1998

US005755860A

[54] INVISIBLE FLUORESCENT JET INK

[75] Inventor: Linfang Zhu, Naperville, Ill.

[73] Assignee: Videojet Systems International, Inc., Wood Dale, Ill.

[21] Appl. No.: 770,753

[22] Filed: Dec. 19, 1996

[51] Int. Cl.$^6$ .................................................. C09D 11/14
[52] U.S. Cl. ............................. 106/31.15; 106/31.05; 106/31.06; 106/31.24
[58] Field of Search ........................... 106/31.05, 31.06, 106/31.15, 31.24

[56] References Cited

U.S. PATENT DOCUMENTS

| | | | |
|---|---|---|---|
| 3,060,429 | 10/1962 | Winston | 346/11 |
| 3,298,030 | 1/1967 | Lewis et al. | 347/74 |
| 3,373,437 | 3/1968 | Sweet et al. | 347/74 |
| 3,416,153 | 12/1968 | Hertz et al. | 347/73 |
| 3,673,601 | 6/1972 | Hertz | 347/73 |
| 4,015,131 | 3/1977 | McDonough et al. | 106/31.15 |
| 4,150,997 | 4/1979 | Hayes | 106/31.15 |
| 4,153,593 | 5/1979 | Zabiak et al. | 106/31.15 |
| 4,186,020 | 1/1980 | Wachtel | 106/31.24 |
| 4,202,491 | 5/1980 | Suzuki | 235/491 |
| 4,242,139 | 12/1980 | Tröster | 106/31.15 |
| 4,243,694 | 1/1981 | Mansukhani | 106/31.5 |
| 4,540,595 | 9/1985 | Acitelli et al. | 427/7 |
| 4,736,425 | 4/1988 | Jalon | 380/59 |
| 4,983,817 | 1/1991 | Dolash et al. | 235/462 |
| 5,091,006 | 2/1992 | Sarada et al. | 106/31.15 |
| 5,093,147 | 3/1992 | Andrus et al. | 427/7 |
| 5,135,569 | 8/1992 | Mathias | 106/31.15 |
| 5,286,286 | 2/1994 | Winnik et al. | 106/31.15 |
| 5,366,252 | 11/1994 | Nishida et al. | 283/94 |
| 5,522,921 | 6/1996 | Custer | 106/31.15 |
| 5,594,044 | 1/1997 | Yang | 106/31.05 |
| 5,674,923 | 10/1997 | Subbaraman et al. | 427/335 |

FOREIGN PATENT DOCUMENTS

| | | |
|---|---|---|
| 3529798 | 2/1987 | Germany. |
| 4013456 | 10/1991 | Germany. |
| 53-140105 | 12/1978 | Japan. |
| 58-45999 | 3/1983 | Japan. |
| 1-135683 | 5/1989 | Japan. |
| 2171280 | 7/1990 | Japan. |

OTHER PUBLICATIONS

Chandrasekhar, R., "The Fluorescence of Polymer Powders and Their Dispersions for Ink–Jet Printing", *Journal of Imaging Technology*, 16, 158–161 (Aug., 1990).

Keeling, "Ink Jet Printing", *Phys. Technology*, vol. 12(5), 196–203 (1981), no month available.

Kuhn et al., "Ink–Jet Printing", *Scientific American*, pp. 162–166, 168, 170, 172, 175, 176, 178 (1979) no month.

*Primary Examiner*—Helene Klemanski
*Attorney, Agent, or Firm*—Leydig, Voit & Mayer, Ltd.

[57] ABSTRACT

Disclosed is a jet ink composition suitable for printing marks on metal, glass, plastics, rubber, or paper comprising an ink carrier, a fluorescent colorant, a cellulosic binder resin, and a tetraalkyl ammonium or phosphonium salt. The jet printed marks do not blush, bleed, or fade, as a result of exposure to steam, or hot and cold water. Also disclosed is an improved process of jet printing on substrates comprising printing with the disclosed jet ink composition.

20 Claims, No Drawings

INVISIBLE FLUORESCENT JET INK

TECHNICAL FIELD OF THE INVENTION

The present invention generally relates to ink jet printing fluorescent ink compositions, and particularly to ink jet printing fluorescent ink compositions whose marks resist blushing, bleeding, or fading as a result of exposure to water.

BACKGROUND OF THE INVENTION

Ink jet printing is a well-known technique by which printing is accomplished without contact between the printing device and the substrate on which the printed characters are deposited. Briefly described, ink jet printing involves the technique of projecting a stream of ink droplets to a surface and controlling the direction of the stream electronically so that the droplets are caused to form the desired printed image on that surface. This technique of noncontact printing is particularly well suited for application of characters onto irregularly shaped surfaces, including, for example, the bottom of glass, metal, or plastic containers, used for holding cosmetic, pharmaceutical, liquor, and health care products.

Reviews of various aspects of ink jet printing can be found these publications: Kuhn et al., *Scientific American*, April, 1979, 162–178; and Keeling, *Phys. Technol.*, 12(5), 196–303 (1981). Various ink jet apparatuses are described in the following U.S. Pat. Nos.: 3,060,429, 3,298,030, 3,373,437, 3,416,153, and 3,673,601.

In general, an ink jet ink composition must meet certain rigid requirements to be useful in ink jet printing operations. These relate to viscosity, resistivity, solubility, compatibility of components and wettability of the substrate. Further, the ink must be quick-drying, smear resistant, and be capable of passing through the ink jet nozzle without clogging, and permit rapid cleanup of the machine components with minimum effort.

The marking of articles such as bank checks, envelopes, certificates, and the like, as well as food containers such as metal, plastic or glass containers with identification marks for later identification and/or sorting is well known. Several methods have been proposed for producing such security or identification marks. For example, infrared readable bar codes have been proposed. See, e.g., Japanese Patent Application Kokai No. 58-45999 and U.S. Pat. No. 5,366,252.

The methods based on infrared readable materials have the disadvantage that the infrared absorbing bar codes are to some extent visible to the unaided eye and need to be physically concealed. The concealment of the bar code results in covering up of a portion of the article, thereby adversely affecting the aesthetics of the article.

Fluorescent materials have been considered for marking purposes. It is known that fluorescence is the property of a material to emit radiation as the result of exposure to radiation from some other source. The emitted radiation persists only as long as the exposure is subjected to radiation. The fluorescent radiation generally has a wavelength longer than that of the absorbed radiation.

There has been significant developmental activity in the area of fluorescent jet inks for producing security marks on envelopes and documents. For instance, U.S. Pat. No. 5,093,147 discloses a method for providing intelligible marks that are virtually invisible to the unaided eye on the surface of an article. The method employs a jet ink containing an organic laser dye that is poorly absorptive in the visible range of about 400 to 700 nm, is absorptive of radiation in the near infrared range of at least 750 nm, and fluoresces in response to radiation excitation in the infrared range at a wavelength longer than that of the exciting radiation.

U.S. Pat. No. 4,736,425 discloses a method of marking fiduciary documents requiring authentication by the use of certain fluorescent chelates. The method comprises introducing only a part of the elements forming the chelate onto the document to be marked and subsequently contacting the document for authentication purpose with the missing part of the elements forming the chelate to effect the synthesis of the fluorescent chelate. The chelate thus formed is excited by ultraviolet radiation and the resulting fluorescence radiation is detected.

U.S. Pat. No. 4,540,595 discloses a jet ink that can be used to mark documents such as bank checks for automatic identification. The ink contains certain phenoxazine derivative dyes that are visible to the unaided eye and fluoresce in the near infrared region (650 to 800 nm) upon activation using an activating light having a wavelength in the range of 550 to 700 nm. The ink that is visible to the unaided eye is unfortunately not suitable for many security mark applications.

Commonly owned and copending U.S. patent application Ser. No. 08/661,180, filed Jun. 10, 1996, discloses jet ink compositions suitable for marking on white or light colored substrates such as envelopes. The ink composition comprises a fluorescent colorant and an ink carrier. The colorant comprises a rare earth metal and a chelating agent. The mark produced by the ink composition is completely or substantially invisible to the unaided eye and is visible only when excited by ultraviolet light.

Metal containers such as, for example, empty containers used to can foods or beverages such as coffee, beer, soup, and others are shipped to the fillers with identification marks placed thereon by the container manufacturer. At the fillers' premises, the containers are subjected to various treatments including autoclaving in presence of steam, and immersing the containers in water. The autoclaving is carried out at temperatures as high as 250° F. for times up to 30 minutes. The immersion testing typically is carried out by immersing the containers in selected temperature waters ranging from ice water to boiling water for a period ranging from about 5 minutes to about 30 minutes. It has been a problem with some of the previously known fluorescent jet ink compositions that the marks tend to blush, bleed, or fade as a result of one or more of these treatments. When the mark becomes visible to the unaided eye, it is said to have blushed. When the mark becomes diffuse, it said to have bled. When the mark becomes unreadable or poorly readable due to reduced color intensity, it is said to have faded.

In the area of marking objects such as metals, the following publications are of interest. German Patent DE 3529798 reportedly discloses a jet ink for placing on metals, plastics, paper, or glass identification marks that are invisible to the naked eye consisting of an alcohol solvent, a fluorescent substance that is soluble in a water/ethanol mixture, a water-soluble polyacrylate, and optionally a water-soluble cellulose ester and diethanolamine.

German Patent DE 4013456 reportedly discloses a jet ink containing an organic solvent, a fluorescent dyestuff, a polyamic acid or polyimide binder resin, and conductive salts. The ink is said to adhere well to glass, ceramic, and copper.

Commonly owned and copending U.S. patent application Ser. No. 08/686,191, filed Jul. 26, 1996, discloses a jet ink composition suitable for producing blush resistant marks that are invisible to the unaided eye and are visible only when excited by an exciting radiation comprising a solvent, a fluorescent colorant, a binder resin, and a plasticizer having a vapor pressure of about 15 mm Hg or less at 240° C.

The foregoing indicates that there exists a need for a jet ink composition comprising a fluorescent colorant suitable for printing identification marks on metals, glass, ceramics, and plastics.

Thus, there exists a need for a jet ink composition suitable for printing on substrates, particularly metal containers, marks that resist blushing. There also exists a need for a jet ink composition suitable for printing on substrates, particularly metal containers, marks that resist bleeding. There also exists a need for a jet ink composition suitable for printing on substrates, particularly metal containers, marks that resist fading.

These and other objects of the present invention will be apparent from the detailed description of the preferred embodiments of the invention set forth below.

SUMMARY OF THE INVENTION

The foregoing needs have been fulfilled to a great extent by the present invention which provides a jet ink composition comprising a fluorescent colorant suitable for printing identification marks on metals, glass, plastic, ceramics, or paper.

The jet ink composition of the present invention comprises an ink carrier, a fluorescent colorant, a cellulosic binder resin, and a tetraalkyl ammonium or phosphonium salt.

The marks printed using the inventive jet ink composition have at least one, and preferably more than one, advantage. These advantages are blush resistance, bleed resistance, and fade resistance.

The present invention further provides an improved process of jet printing on metal, glass, plastic, rubber, or paper substrates. The improvement comprises projecting a stream of ink droplets of a jet ink composition to the surface of the substrates and controlling the direction of the stream electronically so that the droplets are caused to form the desired marks on the surface.

While the invention has been described and disclosed below in connection with certain preferred embodiments and procedures, it is not intended to limit the invention to those specific embodiments. Rather it is intended to cover all such alternative embodiments and modifications as fall within the spirit and scope of the invention.

DETAILED DESCRIPTION OF THE PREFERRED EMBODIMENTS

The present invention provides jet ink compositions suitable for printing marks that are invisible to the unaided eye and are visible only when excited by an exciting radiation.

The present invention further provides a jet ink composition suitable for producing blush resistant marks that are invisible to the unaided eye and are visible only when excited by an exciting radiation.

The present invention further provides a jet ink composition suitable for producing bleed resistant marks that are invisible to the unaided eye and are visible only when excited by an exciting radiation.

The present invention further provides a jet ink composition suitable for producing fade resistant marks that are invisible to the unaided eye and are visible only when excited by an exciting radiation.

The jet ink composition of the present invention comprises a an ink carrier, a fluorescent colorant, a cellulosic binder resin, and a tetraalkyl ammonium or phosphonium salt.

GENERAL PROPERTIES

In general, the jet ink composition of the present invention exhibit the following characteristics for use in ink jet printing systems: (1) a Brookfield viscosity of from about 1.6 to about 7.0 centipoises (cps) at 25° C.; (2) an electrical resistivity of from about 20 to about 2000 ohm-cm; and (3) a sonic velocity of from about 1100 to about 1700 meters/second.

A detailed discussion of the various components and a method of preparation of the inventive jet ink composition is set forth below.

FLUORESCENT COLORANTS

Any suitable fluorescent colorant that is substantially or completely invisible to the unaided eye can be used in the preparation of the inventive ink composition. The fluorescent colorant absorbs outside the visible range, and fluoresces at a wavelength longer than the absorption wavelength. Preferably, the fluorescent colorant absorbs in the wavelength region of from about 275 nm to about 400 nm and emits in the wavelength region of from about 420 nm to about 520 nm. A fluorescent colorant that emits a blue line is further preferred.

An example of a suitable fluorescent colorant is 2,2'-(2,5-thiophenediyl)-bis(5-tert-butylbenzoxazole), which is available as UVITEX OB from Ciba-Geigy Corp. in Hawthorne, N.Y. UVITEX OB is a yellow crystalline powder having a melting point of 197°–203° C. It has good lightfastness, excellent resistance to heat, and high chemical stability. UVITEX OB can be heated for 8 hours at 300° C. in a nitrogen atmosphere without decomposition. The colorant also can be heated for the same period at 200° C. in air without decomposition. UVITEX OB has an absorption maximum at 375 nm (extinction coefficient 1,200 at 1%, 1 cm) and a fluorescence maximum at 435 nm when measured in ethanol solution. The colorant produces a blue fluorescence. UVITEX OB is known to be useful as an optical brightener in plastics.

Examples of other optical brighteners can be found in *Kirk-Othmer Encyclopedia of Chemical Technology*, 4, "Fluorescent Brighteners", pp. 213–225 (1978), and include the stilbene derivatives such as 4,4'-bis(triazin-2-ylamino)stilbene-2,2'-disulfonic acid derivatives wherein the triazinyl groups are substituted with suitable substituents, including substituents such as anilino, sulfanilic acid, metanilic acid, methylamino, N-methyl-N-hydroxyethylamino, bis (hydroxyethylamino), morpholino, diethylamino, and the like; mono(azol-2-yl) stilbenes such as 2- (stilben-4-yl) naphthotriazoles and 2-(4-phenylstilben-4-yl)benzoxazoles; bis(azol-2-yl)stilbenes such as 4,4'-bis(triazol-2-yl)stilbene-2,2'-disulfonic acids; styryl derivatives of benzene and biphenyl such as 1,4-bis(styryl)benzenes and 4,4' bis(styryl) biphenyls; pyrazolines such as 1,3-diphenyl-2-pyrazolines; bis(benzazol-2-yl) derivatives having as phenyl ring substituents alkyl, COO-alkyl, and $SO_2$-alkyl; bis(benzoxazol-2-yl) derivatives; bis(benzimidazol-2-yl) derivatives such as 2-(benzofuran-2-yl)benzimidazoles; coumarins such as 7-hydroxy and 7-(substituted amino) coumarins, 4-methyl-7-amino-coumarin derivatives, esculetin, β-methylumbelliferone, 3-phenyl-7-(triazin-2-ylamino) coumarins, 3-phenyl-7-aminocoumarin, 3-phenyl-7-(azol-2-yl)coumarins, and 3,7-bis(azolyl)coumarins; carbostyrils, naphthalimides, alkoxynaphthalimides, derivatives of dibenzothiophene-5,5-dioxide, pyrene derivatives, and pyridotriazoles.

Coumarin type fluorescent colorants can be obtained commercially from BASF Corp. in Holland, Mich. Thus, coumarin is sold as CALCOFLUOR WHITE LD or Fluorescent Brightener 130, which has an absorption maximum at 367.8 nm and an emission maximum at 450 nm. Aminocoumarin is sold as CALCOFLUOR WHITE RWP Conc. or RW Solution. The aminocoumarins have an absorption maximum at 374.5 nm and an emission maximum at 450 nm.

Other examples of fluorescent colorants include rare earth metal chelates, and preferably, lanthanide chelates. Examples of lanthanide chelates include those formed by the chelation of organic ligands such as acetylacetone, benzoylacetone, dibenzoylmethane, and salicylic acid with lanthanide ions such as neodymium, europium, samarium, dysprosium, and terbium ions. Examples of such complexes include europium acetylacetonate, samarium acetylacetonate, neodymium benzoylacetonate, terbium salicylate, and dysprosium benzoylacetonate. The aforesaid chelates can be prepared by any suitable method known to those of ordinary skill in the art. For example, a ligand such as acetylacetone can be reacted under suitable conditions with a rare earth metal halide such as europium trichloride to produce the rare earth metal chelate. For additional details, see U.S. Pat. No. 4,736,425. The above chelates absorb ultraviolet radiation and fluoresce in the visible range. The acetylacetonate of europium fluoresces with an emission line in the red region and this is particularly suitable for printing on white or light colored substrates.

Examples of commercially available rare earth chelate fluorescent colorants suitable for use in the ink composition of the present invention include, but are not limited to, the rare earth metal chelates sold as LUMILUX C™ pigments by Hoechst-Celanese Corp. in Reidel-de Haen, Germany.

The LUMILUX C rare earth metal organic chelates have a melting point of from about 130° C. to about 160° C. and a bulk density of from about 500 kg/m$^3$ to about 1100 kg/m$^3$. Examples of organic LUMILUX C pigments include Red CD 316, Red CD 331, Red CD 332, Red CD 335, and Red CD 339, which are yellowish when unexcited and fluoresce in the orange-red region when excited by ultraviolet radiation. These pigments are soluble in organic solvents. Red CD 331, a preferred pigment and a derivative of europium-acetonate, is a yellowish powder having an emission peak at 612 nm, a melting point in the range of 153°–155° C., and a density of 600 kg/m$^3$. Red CD 331 is soluble in acetone, ethylacetate, ethanol, xylene, dichloromethane, dimethylformamide, n-hexane, and dibutylphthalate. Red 316 is a rare earth acetylacetonate. Red CD 332, a rare earth biketonate, has a melting of 135°–138° C. and a density of 500 kg/m$^3$. Red CD 335, an europium chelate, has a melting point of 133° C. and a density of 1030 kg/m$^3$.

Additional examples of suitable LUMILUX pigments include Red CD 105, Red CD 106, Red CD 120, and Red CD 131. These are inorganic pigments. Red CD 105 is white when unexcited, fluoresces in the orange-red region when excited by ultraviolet radiation, and has a median particle size of 7 microns. Red CD 106 is white when unexcited, fluoresces in the orange-red region when excited by ultraviolet radiation, and has a median particle size of 6 microns.

Red CD 120 is white when unexcited, fluoresces in the red region when excited by ultraviolet radiation, and has a median particle size of 2.7 microns. Red CD 131 is white when unexcited, fluoresces in the red region when excited by ultraviolet radiation, and has a median particle size of 6.5 microns. It is preferred that the particle size of the aforesaid pigments is further reduced by suitable means including grinding and crushing for use in the preparation of the jet ink composition.

Examples of other fluorescent colorants include the porphyrin type dyes described in U.S. Pat. No. 5,256,193. These include, e.g., the tetra- chloride, bromide, tosylate, triflate, perchlorate, acetate, and fluoroborate salts of 5,10,15,20-tetrakis-(1-methyl-4-pyridyl)-21H,23H-porphine, 5,10,15, 20-tetrakis-(1-hydroxymethyl-4-pyridyl)-21H,23H-porphine, 5,10,15,20-tetrakis-[1-(2-hydroxyethyl)-4-pyridyl]-21H,23H-porphine, 5,10,15,20-tetrakis-[1-(3-hydroxypropyl)-4-pyridyl]-21H,23H-porphine, 5,10,15,20-tetrakis-[1-(2-hydroxyethoxyethyl)-4-pyridyl]-21H,23H-porphine, and 5,10,15,20-tetrakis-[4-(trimethylammonio)phenyl]-21H,23H-porphine. These colorants are excitable in the 380–500 nm range, and fluoresce in the 600–800 nm range.

Any suitable amount of the colorant can be used to prepare the jet ink composition of the present invention. If the ultraviolet absorptivity or the fluorescent emission intensity is high, then a small amount of the colorant is sufficient. If the ultraviolet absorptivity or the fluorescent emission intensity is low, then the amount of the colorant used should be increased. The colorant is used preferably in an amount of from about 0.01% by weight to about 1% by weight of the jet ink composition, and more preferably in an amount of from about 0.1% by weight to about 0.5% by weight of the jet ink composition.

INK CARRIER

The jet ink composition of the present invention comprises one or more solvents as the ink carrier. Any suitable solvent can be used in the preparation of the inventive jet ink composition, and preferably one or more organic solvents are employed. It is further preferred that the solvent evaporates rapidly under the printing conditions and without leaving behind a solvent residue. Organic solvents suitable for the preparation of the jet ink composition of the instant invention include ketones such as acetone, methyl ethyl ketone, diethyl ketone, cyclohexanone, and the like, esters such ethyl acetate, propyl acetate, butyl acetate, amylacetate, and the like, alcohols such methanol, ethanol, n-propanol, isopropanol, n-butanol, i-butanol, t-butanol, n-pentanol, n-hexanol, and the like. If desired, a mixture of solvents may be used.

Any suitable amount of the ink carrier can be used in the preparation of the jet ink composition of the present invention. The ink carrier is typically present in an amount of from about 30% to about 80% by weight, and preferably in an amount of from about 60% to about 75% by weight of the jet ink composition.

BINDER RESINS

The jet ink composition of the present invention comprises at least one binder resin which forms a film on the colorant. The binder resin also serves to improve the adhesion of the colorant and other ingredients to the printed surface. The binder resin is preferably colorless and thus does not impart visibility to the marks. Any suitable binder resin can be employed, and preferably a good film former is employed. A good film former rapidly forms a tough durable film as the result of the evaporation of the solvent.

It is preferred that the binder resin, or the main binder resin when a mixture of binder resins is employed, has a melting point or softening point above about 100° C. It is further preferred that the melting or softening point is about 120° C. or higher, and it is even further preferred that the melting or softening point is in the range of from about 120° C. to about 200° C. In certain embodiments of the present invention, the melting point or softening point of the binder resin can be about 150° C. or higher, especially for producing a mark that can survive the autoclaving treatment.

It is further preferred that the binder resin has low water absorption, preferably below about 3% by weight of the binder resin, and more preferably below about 1% by weight of the binder resin. It is also preferred that the binder resin has a low acid number, preferably below about 50, and more preferably below about 10. It is further preferred that the binder resin is soluble in common organic solvents such as ketones, alcohols, or esters.

Examples of suitable binder resins include cellulosic resins such as nitrocellulose, cellulose acetate, cellulose acetate butyrate, and cellulose acetate propionate. Several grades of nitrocellulose, a preferred binder resin, are available commercially, e.g., from Hercules, Inc. in Wilmington, Del. These grades vary in nitrogen content and viscosity. The nitrogen content of the nitrocellulose resin is preferably in an amount of from about 11% by weight to about 13% by weight, and more preferably in an amount of from about 11.8% by weight to about 12.2% by weight of the resin. Hercules' RST™ type nitrocellulose has an average nitrogen content of 12% by weight and is available in a large number of viscosity grades, from 10 centipoises to about 2,000 seconds, measured on a 12.2% by weight solution in toluene. The nitrocellulose resin having low viscosities, e.g., a viscosity of about 10–15 cps, is particularly preferred.

The RS type nitrocellulose resins have a softening point range of 155°–220° C., and the moisture absorption of unplasticized clear film at 21° C. in 24 hours in 80% relative humidity is 1% by weight.

Cellulose acetate propionate (CAP) and cellulose acetate butyrate (CAB) can be obtained from Eastman Chemical, Kingsport, Tenn. CAB-553-0.4 has a glass transition temperature of 136° C. and a melting point of 150° C., and CAP-504-0.2 has a glass transition temperature of 159° C. and a melting point of 190° C.

The binder resin can be present in the jet ink composition in any suitable amount. It is preferably present in an amount of from about 5% by weight to about 15% by weight of the jet ink composition, and more preferably in an amount of from about 10% by weight of the jet ink composition.

Certain embodiments of the jet ink composition include, in addition to the cellulosic resin, a silicone resin. For example, it has been found that uncoated aluminum substrates can be printed advantageously using jet ink compositions containing nitrocellulose and silicone resins.

Any suitable silicone resin can be used, linear, branched or crosslinked, preferably those having a weight average molecular weight of from about 1000 to about 10,000, more preferably those having a weight average molecular weight of from about 2000 to about 8000, and even more preferably those having a weight average molecular weight of from about 2000 to about 4000. A particularly preferred silicone resin is the DOW CORNING™ 6-2230 resin. The DC-6-2330 resin has a silanol content of 5% by weight of the resin, a weight average molecular weight of 2000–4000, and a degree of crosslinking of 1.2 on a scale where 1.0 is completely crosslinked and 2.0 is fully linear.

The silicone resin can be present in the jet ink composition in any suitable amount. It is typically present in an amount of up to about 5% by weight of the jet ink composition, preferably in an amount of from about 1% by weight to about 3% by weight of the jet ink composition.

SURFACTANT

The jet ink composition may further contain a surfactant, which may be anionic, cationic, nonionic, or amphoteric. Examples of anionic surfactants include alkylbenzene sulfonates such as dodecylbenzene sulfonate, alkylnaphthyl sulfonates such as butyl or nonyl naphthyl sulfonate, dialkyl sulfosuccinates such as diamyl sulfosuccinate, alcohol sulfates such as sodium lauryl sulfate, and perfluorinated carboxylic acids such as perfluorodecanoic acid and perfluorododecanoic acid. Nonionic surfactants include the alkylesters of polyethylene glycol, fatty acid esters of glycerol, fatty acid esters of glycol, and the like, and fluorochemical surfactants such as FC 170C, FC 430, FC 431, FC 740, FC 120, FC 248, FC 352, FC 396, FC 807, and FC 824, which are available from 3M Co. FC 430 and FC 431 are fluoroaliphatic polymeric esters. Cationic surfactants include alkylamines, amine oxides, amine ethoxylates, alkyl hydroxyalkyl imidazolines, quaternary ammonium salts, and amphoteric surfactants include the alkylbetaines, the amidopropylbetaines, and the like.

The surfactant may be present in the jet ink composition in any suitable amount. When a surfactant is used, it is typically used in an amount of from about 0.01% to about 1% by weight of the jet ink composition, and preferably in an amount of about 0.1% by weight of the jet ink composition.

PLASTICIZER

The jet ink composition of the present invention includes one or more plasticizers. It is believed that the plasticizer may also contribute to the improved properties of the marks, particularly the blush resistance. It is also believed that the hydrophobic plasticizer prevents or retards the diffusion of water, especially hot water, into the film formed by the binder resin.

Any suitable hydrophobic plasticizer can be used. Examples of suitable plasticizers include trialkyl phosphates, wherein the alkyl group can be branched or linear and have about 1 to about 10 carbon atoms, preferably about 3 to about 5 carbon atoms. A particular example of a suitable plasticizer is tributyl phosphate, which also acts as a flame retardant.

The plasticizer can be present in the jet ink composition in any suitable amount. It is typically present in an amount of up to about 5% by weight, and preferably in an amount of from about 1% to about 3% by weight of the jet ink composition.

HIGH BOILING SOLVENT

The jet ink composition of the present invention may further contain a high boiling solvent, preferably a hydrophilic high boiling solvent. When the jet printed ink dries on the substrate, due to the evaporation of the volatile solvents, the mark can cool rapidly and absorb moisture from the surrounding. The absorbed moisture can impart a cloudly appearance to the film formed on the colorant. It has been observed that by including a high boiling hydrophilic solvent in the ink composition, it is possible to reduce or eliminate the development of cloudiness. The hydrophilic solvents have boiling points preferably above 100° C., and more preferably in the range of from about 150° C. to about 250° C.

Any suitable hydrophilic high boiling solvent known to those of ordinary skill in the art can be used. Examples of suitable high boiling solvents include glycols such as ethylene glycol, propylene glycol, glycerin, diglycerin, diethylene glycol, and the like, glycol ethers such as ethylene glycol dimethyl ether, ethylene glycol diethylether, cellosolve, diethylene glycol monoethylether (Carbitol), diethylene glycol dimethylether, and diethylene glycol diethylether dialkyl sulfoxides such as dimethyl sulfoxide, and other solvents such as sulfolane, N-methyl pyrrolidinone (NMP), and the like. NMP is a preferred high boiling solvent.

Any suitable amount of the high boiling solvent can be used, preferably in an amount of up to about 5% by weight of the jet ink composition, and more preferably in an amount of from about 2% by weight to about 4% by weight of the jet ink composition.

CONDUCTIVITY AGENT

The jet ink composition of the present invention further contains a conductivity agent which offers the desired electrical conductivity to the jet ink composition. It has been found that hygroscopic electrolytes tend to absorb water into the mark when exposed to high humidity or water. It is believed that the absorbed water forms micro-droplets in the film on the substrate. When water is later evaporated during drying of the marks, micro-voids are formed in the film, and the micro-voids scatter light. The difference between the refractive indices of the resin(s), which are generally greater than 1, and of air, which is 1, is responsible for the scattering effect. The scattering of light contributes to blushing.

It has been discovered that non-hygroscopic conductivity agents are effective in reducing or eliminating blushing. Any suitable non-hygroscopic conductivity agent can be used, preferably an organic salt is used. Examples of suitable organic salts include tetraalkyl ammonium salts and tetraalkyl phosphonium salts. The alkyl groups can be of any suitable number of carbon atoms, preferably about 1–10 carbon atoms, and more preferably about 2 to about 5 carbon atoms. Particular examples of preferred conductivity agents include tetraethyl or tetrabutyl ammonium or phosphonium salts. The salts can contain any suitable anion. Examples of suitable anions include chloride, bromide, and p-toluenesulfonate. Thus, particular examples of non-hygroscopic conductivity agents include tetraethyl ammonium chloride, tetraethyl ammonium bromide, tetrabutyl ammonium chloride, tetrabutyl ammonium bromide, tetrabutyl phosphonium chloride, tetrabutyl phosphonium bromide, and tetraethyl ammonium p-toluenesulfonate, which can be obtained from Aldrich Chemical Co. in Milwaukee, Wis.

Any suitable amount of the conductivity agent can be used to achieve the desired electrical conductivity. The agent is preferably present in the jet ink composition in an amount of from about 0.1% to about 2% by weight of the jet ink composition, and more preferably in an amount of from about 0.4% by weight to about 1.2% by weight of the jet ink composition.

The jet ink composition of the present invention can be prepared by any suitable method known to those of ordinary skill in the art. For example, the components can be sequentially added to a mixer and blended until a smooth ink composition is obtained. The ink composition can be filtered, e.g., using a 5-micron sock filter, to remove any impurities.

The following examples further illustrate the present invention but, of course, should not be construed as in any way limiting its scope.

EXAMPLE 1

This Example illustrates a preferred combination of the various ingredients of the jet ink composition of the present invention. IPA below stands for isopropanol.

| Materials | Preferred Range, Wt. % |
| --- | --- |
| Acetone (Solvent) | about 50.0–about 95.0 |
| Methanol (Solvent) | up to about 30.0 |
| 1-Methyl 2-Pyrrolidone (Solvent) | up to about 5.0 |
| Nitrocellulose RS (10–15 cps, wetted with 30% IPA) (Binder) | about 5.0–to about 15.0 |
| Silicon DC6-2230 (Binder) | up to about 5.0 |
| Tetrabutylphosphonium Bromide (Conductive salt) | about 0.4–to about 1.2 |
| Tributyl phosphate (Plasticizer) | about 1.0–to about 5.0 |
| FC-430 (10% in acetone) (Surfactant) | up to about 1.0 |
| UVITEX OB (Brightener) | about 0.1–to about 0.5 |

EXAMPLE 2

This Example illustrates an optimal combination of ingredients of the jet ink composition of the present invention illustrated in Example 1.

| Materials | Wt. % |
| --- | --- |
| Acetone | 62.5 |
| Methanol | 19.5 |
| 1-methyl-a-pyrrolidome | 3.0 |
| Nitrocellulose | 10.0 |
| Silicone DC6-2230 | 2.0 |
| Tetrabutylphosphonium bromide | 0.6 |
| Tributylphosphate | 2.0 |
| FC-430 | 0.1 |
| UVITEX OB | 0.3 |
| | 100.0 |

A jet ink composition was prepared using the ingredients listed above by combining and mixing them until a smooth ink composition was obtained.

EXAMPLE 3

This Example illustrates another preferred combination of the various ingredients that can be used to prepare a jet ink composition of the present invention.

| Materials | Preferred Range, Wt % |
| --- | --- |
| Methyl ethyl ketone (Solvent) | about 30.0–to about 80.0 |
| Methanol (Solvent) | about 10.0–to about 50.0 |
| 1-Methyl 2-Pyrrolidone (Solvent) | up to about 5.0 |
| Nitrocellulose RS (10–15 cps, wetted with 30% IPA) (Binder) | about 5.0–to about15.0 |
| Silicon DC6-2230 (Binder) | up to about 5.0 |
| Tetrabutylphosphonium Bromide (Conductive salt) | about 0.5–to about 1.5 |

-continued

| Materials | Preferred Range, Wt % |
|---|---|
| Tributyl phosphate (Plasticizer) | about 1.0–to about 5.0 |
| FC-430 (10% in acetone) (Surfactant) | up to about 1.0 |
| UVITEX OB (Brightener) | about 0.1–to about 1.0 |

EXAMPLE 4

This Example illustrates an optimal combination of ingredients of the jet ink composition of the present invention illustrated in Example 3.

| Materials | Wt. % |
|---|---|
| Methyl ethyl ketone | 61.65 |
| Methanol | 20.0 |
| 1-Methyl-2-pyrrolidone | 3.0 |
| Nitrocellulose | 10.0 |
| Silicone DC6-2230 | 2.0 |
| Tetrabutylphosphonium bromide | 1.0 |
| Tributylphosphate | 2.0 |
| FC-430 | 0.1 |
| UVITEX OB | 0.25 |
| | 100.00 |

A jet ink composition was prepared using the ingredients listed above by combining and mixing them until a smooth ink composition was obtained.

EXAMPLE 5

This Example illustrates another preferred combination of the various ingredients of the jet ink composition of the present invention.

| Materials | Preferred Range, Wt. % |
|---|---|
| Acetone (Solvent) | about 50.0–to about 95.0 |
| Duplicating fluid #5, anhydrous (Solvent) | up to about 30.0 |
| 1-Methyl 2-Pyrrolidone (Solvent) | up to about 5.0 |
| Nitrocellulose RS (10–15 cps, wetted with 30% IPA) (Binder) | about 5.0–to about 15.0 |
| Silicon DC6-2230 (Binder) | up to about 5.0 |
| Tetrabutylphosphonium Bromide (Conductive salt) | about 0.4–to about 1.2 |
| Tributyl phosphate (Plasticizer) | about 1.0–to about 5.0 |
| FC-430 (10% in acetone) (Surfactant) | up to about 1.0 |
| UVITEX OB (Brightener) | about 0.1–to about 0.5 |

EXAMPLE 6

This Example illustrates an optimal combination of the ingredients of the jet ink composition of the present invention illustrated in Example 5.

| Materials | Wt. % |
|---|---|
| Acetone | 71.65 |
| Duplicating fluid #5, anhydrous (Solvent) | 10.0 |
| 1-Methyl 2-Pyrrolidone (Solvent) | 3.0 |
| Nitrocellulose RS (10–15 cps, wetted with 30% IPA) (Binder) | 10.0 |
| Silicone DC6-2230 | 2.0 |
| Tetrabutylphosphonium Bromide (Conductive salt) | 1.0 |
| Tributyl phosphate (Plasticizer) | 2.0 |
| FC-430 (10% in acetone) | 0.1 |
| UVITEX OB | 0.25 |
| | 100.00 |

A jet ink composition was prepared using the ingredients listed above by combining and mixing them until a smooth ink composition was obtained. Duplicating fluid #5 is ethanol denatured with isopropanol and n-propyl acetate.

EXAMPLE 7

This Example illustrates the properties of the marks produced from the inventive ink compositions set forth in Examples 2, 4, and 6. Metal cans from three different suppliers were employed in this study. The cans from supplier 1 were made of aluminum, steel, and tin. The cans from supplier 2 were made of aluminum, and the cans from supplier 3 were made of steel and tin. The cans were subjected to testing under a variety of conditions. The results obtained are set forth below and confirm that the marks have excellent fading, bleeding and blushing resistance.

| | Fading/Bleeding/Blushing* | | |
|---|---|---|---|
| | Example 2 | Example 4 | Example 6 |
| Cans From Supplier 1 | | | |
| Retort 250° F./30 min (Cans filled w/98° C. water) | No/No/0 | No/No/0 | No/No/0 |
| 50° C./5 min (Cans filled w/98° C. water) | No/No/0 | No/No/0 | No/No/0 |
| 40° C./5 min (cans filled w/98° C. water) | No/No/0 | No/No/0 | No/No/0 |
| 35° C./5 min (cans filled w/98° C. water) | No/No/0 | No/No/0 | No/No/0 |
| Coated Cans From Supplier 2 | | | |
| Retort (125° C./30 mins) | No/No/0 | No/No/0 | No/No/0 |
| Dipped in 100° C. water/30 min | No/No/0 | No/No/0 | No/No/0 |
| Dipped in 80° C. water/30 min | No/No/0 | No/No/0 | No/No/0 |
| Dipped in 60° C. water/30 min | No/No/0 | No/No/0 | No/No/0 |
| Dipped in 40° C. water/30 min | No/No/0 | No/No/0 | No/No/0 |
| Uncoated Cans From Supplier 2 | | | |
| Retort (125° C./30 mins) | No/No/1 | No/No/1 | No/No/1 |
| Dipped in 100° C. water/30 min | No/No/0 | No/No/0 | No/No/0 |
| Dipped in 80° C. water/30 min | No/No/0 | No/No/0 | No/No/0 |
| Dipped in 60° C. water/30 min | No/No/0 | No/No/0 | No/No/0 |
| Dipped in 40° C. water/30 min | No/No/0 | No/No/0 | No/No/0 |
| Cans from Supplier 3 | | | |
| with red coating (150° F./5 min) | No/No/0 | No/No/0 | No/No/0 |
| with black coating (150° F./5 min) | No/No/0 | No/No/0 | No/No/0 |

*Blushing is reported on a scale of 0–4. A blushing value of 0 indicates absence of blushing, and a value of 1 indicates very slight blushing. A mark that exhibits extreme blushing will be rated 4.

All of the references, including patents and publications, cited herein are hereby incorporated in their entireties by reference.

While this invention has been described with an emphasis upon the preferred embodiment, it will be obvious to those of ordinary skill in the art that variations of the preferred embodiment may be used and that it is intended that the invention may be practiced otherwise than as specifically described herein. Accordingly, this invention includes all modifications encompassed within the spirit and scope of the invention as defined by the following claims.

What is claimed is:

1. A jet ink composition suitable for printing marks on metal, glass, plastics, rubber, or paper comprising an ink carrier, a fluorescent colorant, a cellulosic binder resin, and a tetraalkyl ammonium or phosphonium salt, said marks having blush resistance, bleed resistance, or fade resistance.

2. The jet ink composition of claim 1, wherein said composition has (1) a viscosity of from about 1.6 to about 7.0 centipoises at 250° C.; (2) an electrical resistivity of from about 50 to about 2000 ohm-cm; or (3) a sonic velocity of from about 1100 to about 1700 meters/second.

3. The jet ink composition of claim 2, wherein said fluorescent colorant comprises 2,2'-(2,5-thiophenedyl) -bis (5-tert-butylbenzoxazole).

4. The jet ink composition of claim 3, wherein said cellulosic binder resin is nitrocellulose.

5. The jet ink composition of claim 4, wherein said nitrocellulose ha s a nitrogen content of about 12% by weight.

6. The jet ink composition of claim 4, wherein said ink carrier comprises an organic solvent.

7. The jet ink composition of claim 6, wherein said organic solvent comprises a ketone or alcohol.

8. The jet ink composition of claim 7, wherein said ketone is acetone or methyl ethyl ketone.

9. The jet ink composition of claim 7, wherein said alcohol is methanol or ethanol.

10. The jet ink composition of claim 7, wherein said tetraalkyl ammonium or phoshonium salt is a tetrabutyl ammonium or phosphonium salt.

11. The jet ink composition of claim 10, wherein said tetrabutyl phosphonium salt is tetrabutyl phosphonium bromide.

12. The jet ink composition of claim 11, which further comprises a silicone resin.

13. The jet ink composition of claim 12, which further comprises a plasticizer.

14. The jet ink composition of claim 13, wherein said plasticizer is tributyl phosphate.

15. The jet ink composition of claim 14, which further comprises a surfactant.

16. The jet ink composition of claim 15, wherein said surfactant is a fluoroaliphatic polymeric ester.

17. The jet ink composition of claim 15, which further comprises a high boiling solvent.

18. The jet ink composition of claim 17, wherein said high boiling solvent is N-methyl pyrrolidone.

19. In an improved process of jet printing on metal, glass, plastic, rubber, or paper substrates, the improvement comprising projecting a stream of ink droplets of a jet ink composition to the surface of said substrates and controlling the direction of the stream electronically so that the droplets are caused to form the desired printed mark on the surface, said marks having blush resistance, bleed resistance, or fade resistance, said jet ink comprising an ink carrier, a fluorescent colorant, a cellulosic binder resin, and a tetraalkyl ammonium or phosphonium salt.

20. The improved process of claim 19, wherein said fluorescent colorant comprises 2,2'-(2,5-thiophenediyl)-bis (5-tert-butylbenzoxazole).

* * * * *